(No Model.)
J. F. W. GROTE.
BURNER.
No. 592,545. Patented Oct. 26, 1897.
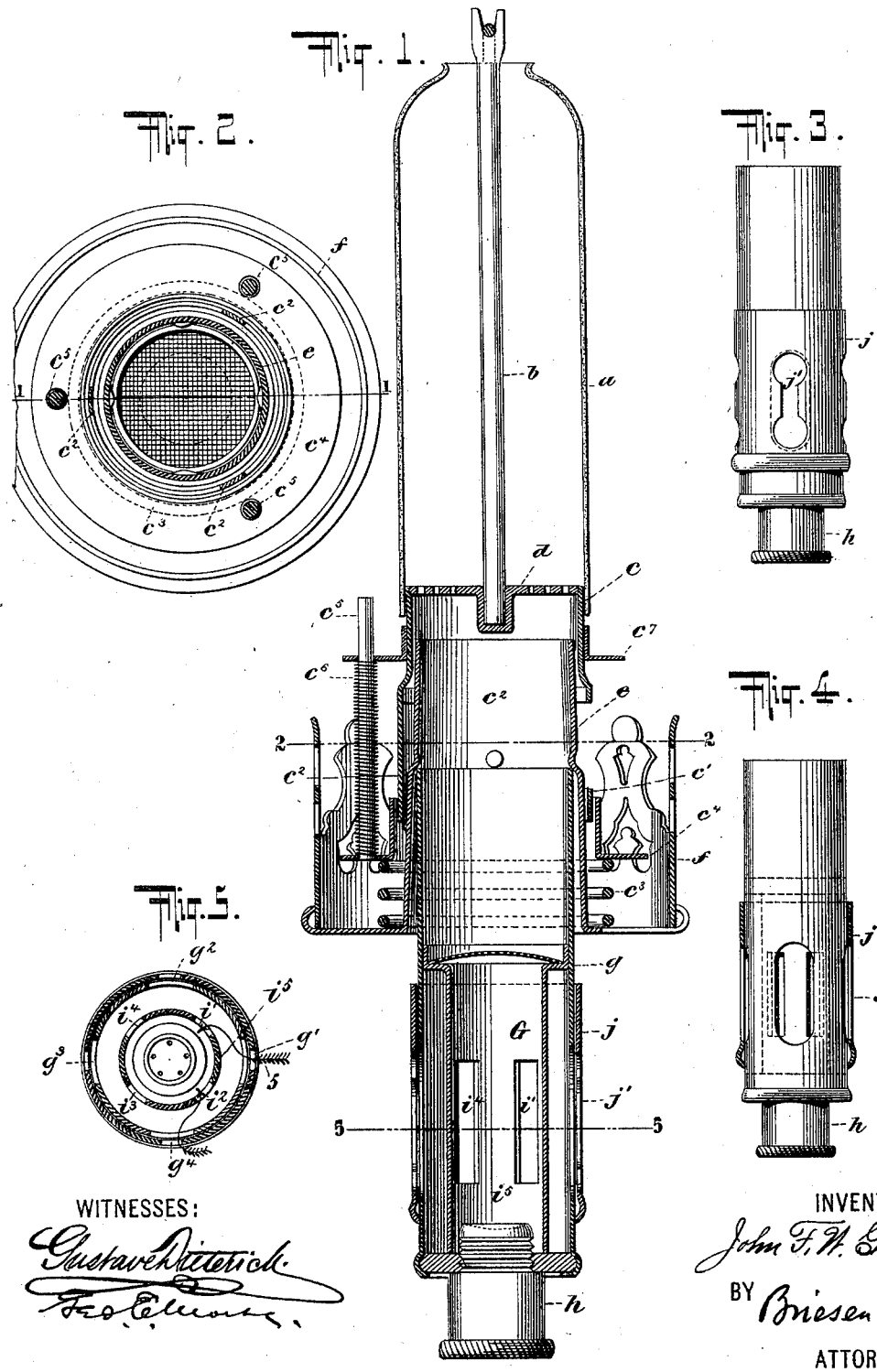
WITNESSES:
INVENTOR
John F. W. Grote,
BY Briesen & Knauth
ATTORNEYS

UNITED STATES PATENT OFFICE.

JOHN F. W. GROTE, OF NEW YORK, N. Y., ASSIGNOR, BY MESNE ASSIGN-
MENTS, TO THE DIAMOND LIGHT COMPANY.

BURNER.

SPECIFICATION forming part of Letters Patent No. 592,545, dated October 26, 1897.

Application filed March 2, 1897. Serial No. 625,790. (No model.)

*To all whom it may concern:*

Be it known that I, JOHN F. W. GROTE, a resident of the city, county, and State of New York, have invented certain new and useful Improvements in Burners, of which the following is a specification.

My invention relates to burners, and has for its object to produce a new and improved burner, particularly of the "Bunsen" type, wherein the common liability of flickering and unsteady light will be obviated.

To this end my invention consists in the construction hereinafter set forth and claimed.

My invention will be understood by referring to the accompanying drawings, which show an incandescent gas-burner of the "Sunlight" type embodying my invention.

In the drawings, Figure 1 is a central vertical section through the burner. Fig. 2 is a sectional plan view thereof, the section being taken on line 2 2 of Fig. 1. Fig. 3 is a side elevation of the mixing-chamber. Fig. 4 is a sectional side elevation of the device shown in Fig. 3, the air-shutter casing being in section; and Fig. 5 is a section on line 5 5 of Fig. 1, clearly showing the staggering of the inlet-openings of the mixing-chamber.

In the drawings, $a$ is a suitable mantle suitably mounted, as by means of the supporting-rod $b$, which is supported from a cup $c$, having a perforated cover $d$. Entering the cup $c$ is a burner-gallery casing $e$, forming part of the gallery $f$, which burner-gallery casing is entered by an outer mixing-chamber casing $g$, which is supported by means of the nipple $h$. This outer casing $g$ of the mixing-chamber G is suitably apertured, as with apertures $g'$ $g^2$ $g^3$ $g^4$, as will clearly appear from an inspection of Fig. 5.

Supported within the outer casing $g$ is an inner casing $i$, apertured as at $i'$ $i^2$ $i^3$ $i^4$, which apertures are staggered with respect to the apertures of the outer casing, so that air blowing into the outer casing through its apertures will not pass directly through the apertures of the inner casing, but will strike against a solid portion $i^5$ of the inner casing and will be thereby deflected so as to enter the said inner casing by a tortuous path. This will clearly appear by an inspection of Fig. 5, wherein the arrows 5 indicate the path of the air-currents. It will thus be observed that the air-currents cannot by any possibility pass in a straight or direct path to the interior of the inner casing and of the mixing-chamber, so that objectionable flickering of the burner-flame will be obviated. Surrounding the outside casing $g$, containing the straight-cut apertures $g'$ $g^2$ $g^3$ $g^4$, is an air-shutter casing $j$, provided with dumb-bell-shaped apertures $j'$, which dumb-bell-shaped apertures serve to break the current of air into practically two jets united by a thin stream, as will be well understood. This shutter closely hugs the outside casing and turns freely thereon, so as to regulate the admission of air to the said casing by covering up a greater or less portion of each aperture in the said casing.

Having described the mixing-chamber and its correlated parts, I will now proceed to describe the mantle-mounting. As I have before stated, the mantle $a$ is carried upon the rod $b$, supported by the cup $d$, and as heretofore mounted is extremely liable to breakage when the burner is used in a position where it is exposed to vibration. This cup $c$ is provided with a skeleton guide, embracing the gallery burner-tube $e$, which guide is shown in the present instance as a ring $c'$, surrounding the tube $e$ and joined to the cup $d$ by standards $c^2$. The lower part of the gallery burner-tube is surrounded by a spring $c^3$, which spring supports an angular collar $c^4$, from which rise standards $c^5$, surrounded by coiled springs $c^6$. The guide of the mantle-supporting cup or collar $c$ extends downward into the space between the collar $c^4$ and the gallery burner-tube $e$. The upper portion of the cup or collar $c$ is provided with a flange $c^7$, perforated for the passage of the standard $c^5$ and resting upon the coiled spring $c^3$, surrounding the said standards $c^5$, so that the springs $c^3$ and $c^6$ will act to take up the stress of sudden jars, so that the mantle will not be broken when the burner is jarred.

Having described my invention, what I claim as new, and desire to secure by Letters Patent, is—

1. A mixing-chamber comprising an inner apertured casing, a surrounding outer apertured casing, the said casings being placed with respect to each other in such manner as to bring each of the apertures of the outer casing opposite a solid portion of the wall of the inner casing, combined with a perforated air-shutter for regulating the admission of air to the apertures of the outer casing.

2. The combination of an apertured inner casing and an apertured outer casing having straight-cut apertures substantially as shown, combined with an air-shutter surrounding the said outer casing and having dumb-bell-shaped apertures coöperating with the straight-cut apertures of the outer casing to regulate the air-supply thereto.

3. In a burner, the combination with a mantle-support, of a cup or collar $c$, a plurality of standards guiding the said cup, coiled springs surrounding the said standards and supporting the cup and a spring-supporting means for springily supporting the standards.

4. In a burner, the combination of a mantle-supporting cup or collar $c$, vertically-moving spring-supported standards for guiding the cup or collar in its movement and springs $c^6$ coöperating with the standards and supporting the cup or collar, substantially as described.

JOHN F. W. GROTE.

Witnesses:
GEORGE H. ENGELHARD,
GEO. E. MORSE.